H. BLUMENBERG, Jr.
PROCESS AND APPARATUS FOR THE ELECTROLYTIC GENERATION OF ARSIN, PHOSPHIN, AND STIBIN.
APPLICATION FILED JUNE 11, 1919.
1,375,819.
Patented Apr. 26, 1921.
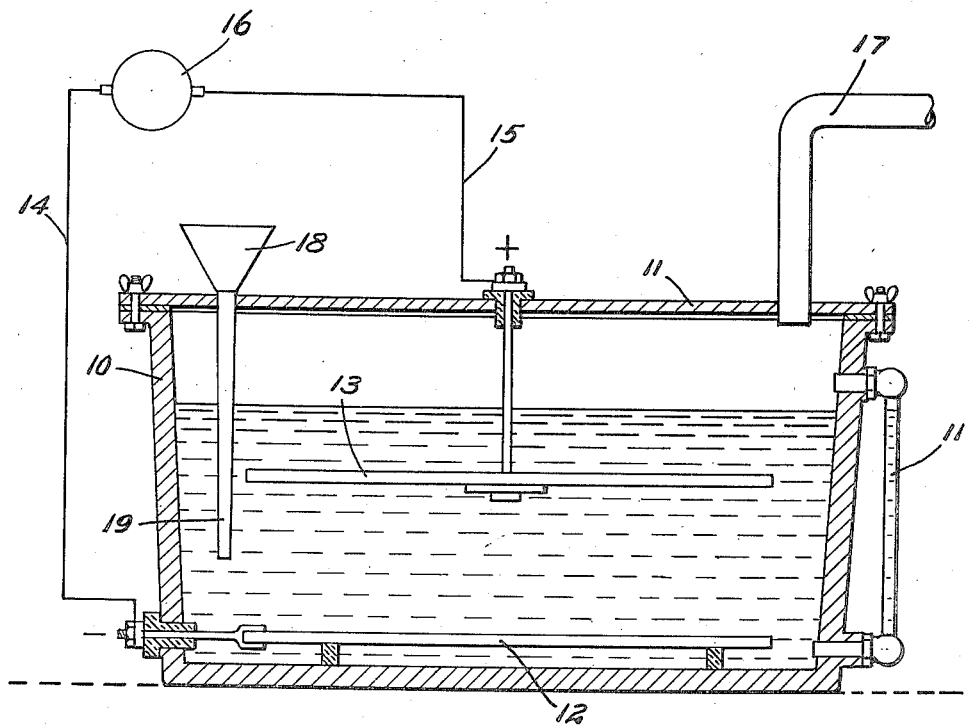
INVENTOR
HENRY BLUMENBERG JR.
BY
Hazard & Miller
ATT'YS.

UNITED STATES PATENT OFFICE.

HENRY BLUMENBERG, JR., OF ORO GRANDE, CALIFORNIA.

PROCESS AND APPARATUS FOR THE ELECTROLYTIC GENERATION OF ARSIN, PHOSPHIN AND STIBIN.

1,375,819.  Specification of Letters Patent.  Patented Apr. 26, 1921.

Application filed June 11, 1919. Serial No. 303,463.

*To all whom it may concern:*

Be it known that I, HENRY BLUMENBERG, Jr., a citizen of the United States, residing at Oro Grande, in the county of San Bernardino and State of California, have invented new and useful Improvements in Processes and Apparatus for the Electrolytic Generation of Arsin, Phosphin and Stibin, of which the following is a specification.

My invention relates to a process of generating a gaseous mixture of oxygen and arsin, phosphin or stibin.

In my co-pending application for a process of destroying scale and the like on citrus trees, Serial No. 303,462 filed June 11, 1919, I have described a process for the destruction of insect pests on citrus trees by treating the same with a gaseous mixture of oxygen and arsin, or phosphin or stibin, or a mixture of the gases just mentioned.

In the art of fumigating citrus trees by means of highly poisonous gases the usual practice is to generate the gases at the place of fumigation. Liquid and solid reagents are used which generate the poisonous gases and the generation of such gases is attended with great danger because of the difficulty of control of the gas generation.

It is an object of this invention to provide a process whereby the generation of the poisonous gases may be started or stopped at will, thereby greatly minimizing the danger attending the fumigation.

The present invention has for its object to provide a safe, simple and efficient process for generating a mixture of oxygen and arsin, or phosphin, or stibin.

My invention consists in the steps of the process hereinafter described and claimed.

In the accompanying drawing, which forms a part of this specification, I have illustrated an apparatus for carrying out my process.

Referring to the drawing, 10 indicates an electrolyzation tank having a gas tight cover 11. 11' is a gage for observing the level of the liquid within the tank 10. A carbon cathode 12, preferably coated with mercury, is horizontally disposed on the bottom of the tank 10, and a carbon anode 13 is horizontally disposed above the cathode. 14 and 15 are electric conductors connecting the cathode and the anode to the negative and positive poles respectively, of an electric source of energy 16. 17 is a gas off-take pipe for conducting the gases generated to a suitable condenser, not shown. 18 is a funnel, the stem 19 of which extends between the anode and the cathode for the introduction of material.

Assuming that it is desired to produce a mixture of oxygen and arsin, a magma of arsenic oxid, $As_2O_3$ is made with a 10% solution of sulfuric acid, to which about 5% of potassium sulfate, $K_2SO_4$, is added, is introduced in the tank 10 and an electric current of about 4 volts is passed between the anode and the cathode. The current strength varies with the internal resistance of the magma and may vary from 5 to 50 amperes per square foot. Potassium ions are disposed in the mercury, and re-acting with the water, generate nascent hydrogen, which in part combines with the arsenic ions, forming arsin, $AsH_3$, which, mixed with the uncombined hydrogen from the cathode, and the oxygen liberated at the anode, pass through the magma and out of the tank 10 by the gas off-take pipe 22 to the condenser. As the arsenic oxid is exhausted, a fresh supply may be introduced to the tank 10 through the funnel 18.

It will, of course, be understood that a number of secondary re-actions occur in the process without affecting the same. The end products, however, are a mixture of oxygen, hydrogen and arsin.

In place of $As_2O_3$ any salt containing arsenic may be used, and in place of the sulfuric acid and potassium sulfate a solution of an alkali metal hydrate, such as potassium or sodium hydrate, may be used, or any compound that is capable, on electrolyzation, of liberating nascent hydrogen.

Where it is desired to make phosphin or stibin corresponding phosphorous or antimony compounds are used, the object being to generate nascent hydrogen at the cathode, which, reacting on the phosphorous or antimony compounds, will form phosphin and stibin, respectively.

In the process and apparatus described the oxygen and the other gases generated are mixed, but it will be obvious that the oxygen may be separated from the other gases by providing a vertical partition in the tank 10 and disposing a cathode vertically on either side of the vertical partition, the lower end of the partition being spaced from the bottom of the tank 10. The oxygen will be generated in one chamber and the other gases in the other chamber, and then, taken off separately to their respective condensers.

Various changes may be made in the steps of the process by those skilled in the art without departing from the spirit of my invention as claimed.

I claim:

1. A process of making a gas consisting of hydrogen and an element of the phosphorous group, with the exception of nitrogen and boron, comprising subjecting a compound of the phosphorous group, with the exception of nitrogen and boron, to electrolyzation in conjunction with a re-agent capable of forming nascent hydrogen at the cathode.

2. A process of making arsin, comprising subjecting an arsenic compound to electrolyzation in the presence of a re-agent capable of generating nascent hydrogen at the cathode.

3. A process of making a mixture of oxygen and a gas consisting of hydrogen and an element of the phosphorous group, with the exception of nitrogen and boron, comprising subjecting a compound of the phosphorous group, with the exception of nitrogen and boron, to electrolyzation, in conjunction with a re-agent capable of forming nascent hydrogen at the cathode and oxygen at the anode, and collecting the gases formed.

4. A process of making a gas mixture of oxygen and arsin, comprising subjecting an arsenic compound to electrolyzation in the presence of a re-agent capable of generating nascent hydrogen at the cathode and oxygen at the anode, and collecting the gases formed.

In testimony whereof I have signed my name to this specification.

HENRY BLUMENBERG, Jr.